TIME-MULTIPLEXING TELEPHONE SYSTEM

Filed Aug. 22, 1960

INVENTOR.
WALTER EMIL WILHELM JACOB
BY Kane and Nydick
ATTORNEYS

United States Patent Office 3,188,393
Patented June 8, 1965

3,188,393
TIME-MULTIPLEXING TELEPHONE SYSTEM
Walter Emil Wilhelm Jacob, Hagersten, Sweden, assignor to Telefonaktiebolaget L M Ericsson, Stockholm, Sweden, a corporation of Sweden
Filed Aug. 22, 1960, Ser. No. 51,158
Claims priority, application Sweden, June 29, 1960, 6,312/60
3 Claims. (Cl. 179—15)

The present invention relates to an arrangement at multichannel-pulse communication systems, in which the signal of the individual communications are transmitted from one subscriber place to another through a transmission medium common for the communications in the form of modulated pulses, at which each subscriber place is connected to the transmission medium over a contact, a coil connected in series with the contact and a low pass filter, whose terminals turned towards the coil are terminated by a condenser, which together with the coil forms an oscillation circuit, the natural oscillation period of which is mainly equal to double the time during which the contacts are closed for transmission of a pulse.

During a time when the switch at a subscriber place is open, the appurtenant condenser is charged through the low pass filter to a potential which is proportional to the amplitude of the momentary speech potential. When the switches, which connect two subscribers with each other, are closed, a recharge course occurs in the oscillation circuit formed by the condensers and inductances of these subscribers, so that after half a period of the resonance frequency the charges of the two condensers have changed places. In this moment the switches are opened and the charges are compensated in the pulse pause through respective low pass filter in the form of a speech current.

When feeding signals from a signal source to a time multiplex system of this kind, a signal circuit is provided with a similar oscillation circuit according to a previously known method, which oscillation circuit consists of an inductance and a condenser but not of a low pass filter since the charging of the condenser must be done in the pause between adjacent channel pulses if the signal source shall be able to be used commonly for several communications in different pulse positions (channels). The charging occurs therefore from the signal source through a circuit, which is dimensioned in a special way, and a switch (contact), which is closed during the pause between the channel pulses. This method of feeding is used especially at two-wire circuit connection between the subscribers owing to certain crosstalk problems.

At four-wire circuit connection between the subscribers with an amplifier in each line going out from the exchange it may seem possible to arrange the signal feeding in such a way that a potential source is connected to the transmission medium directly over a contact which operates coincidentally with the contact of a receiving subscriber. Since a compensating condenser is generally connected to the transmission medium this method is not applicable because for one thing the contact at the potential source can be charged too heavily in each operation moment owing to the influence of the compensating condenser, for the other a rest charge on the compensating condenser remains after each pulse, which charge requires one for the rest oversized leakage circuit so that signal crosstalk to the following channel shall not arise.

The purpose of the present invention is to eliminate said drawbacks. The invention is as mentioned especially applicable in connection with pulse communication systems operating with four-wire systems, where the information transmission is unidirectional in a transmission channel and where an amplifier is connected between the transmission medium and receiving subscriber.

An arrangement according to the invention is characterized thereby that there is a signal potential source for signal feeding to a subscriber place, which signal potential source is periodically connectable to the transmission medium over an inductance and a contact and is arranged to emit together with the remaining circuit elements a potential over the series connection of the coil and the condenser, the lapse of which is mainly symmetrical in relation to the time $$\frac{\tau}{2}$$

and has a minimum value for $t=0$ and $t=\tau$, that the inductance value of said inductance falls below the inductance value of said coil, and that the closing time of the contact connected between the signal potential source and the transmission medium falls below the time $\tau$.

Figure 1:
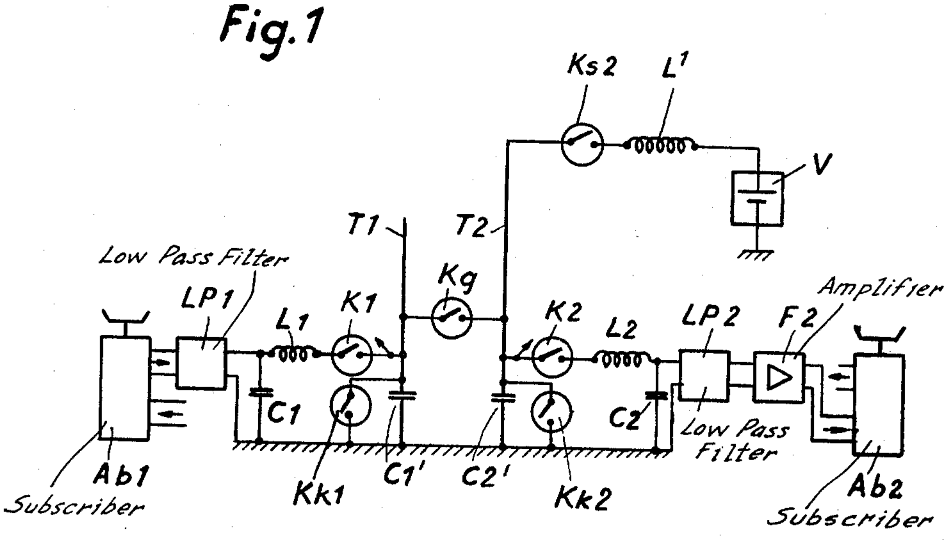
FIG. 1 shows an embodiment of the invention.

In FIG. 1 an electronic telephone exchange operating according to the time multiplex principle is shown, in which only two subscribers *Ab1*, *Ab2* in a four-wire system are shown and only one transmission direction has been drawn in this system, one from *Ab1* to *Ab2*. The subscribers *Ab1* and *Ab2* belong to two different groups of subscribers, one group of which is connected to a transmission conductor T1 and the other to a transmission conductor T2. The subscriber *Ab1* is over a low pass filter LP1, a condenser C1, an inductance L1 and an electronic switch K1 connected to the transmission conductor T1, at which the condenser C1 is a part of the last link of the low pass filter. In a similar way the subscriber *Ab2* is connected over a low pass filter LP2, a parallelly connected condenser C2, an inductance L2 and an electronic switch K2 to the transmission conductor T2. Furthermore, there is an amplifier F2 between the low pass filter LP2 and the subscriber *Ab2* for compensation of the attenuation in the transmission medium connected between the subscribers, which thus consists of the transmission conductors T1 and T2 and an electronic group switch *Kg* connected between them.

At transmission from *Ab1* to *Ab2* the switches K1, *Kg*, K2 are synchronously and periodically closed during a time $\tau=\pi\sqrt{L\cdot C}$, where L represents the inductance value of each one of the inductances L1 and L2, and C represents the capacitance of each one of the condensers C1 and C2. When the switches K1, *Kg*, K2 are open, charge enters to the condenser C1 through the filter LP1 and as the switches are closed during the time $\tau$ this charge oscillates over to the condenser C2 and is then conducted further through the filter LP2 to the amplifier F2 and the subscriber *Ab2* during the following pause. In order to eliminate the disturbing influence from the stray capacitances of the transmission medium, the condensers C1′ and C2′ are connected to the transmission conductors and dimensioned with regard to said stray capacitancies so that the total capacitance between the conductors (the transmission medium) and earth fulfills the relation $$C_1'+C_2'=\frac{2C}{3}$$

or $$C_1'+C_2'=\frac{2C}{15}$$

Hereby is obtained that when the current through the switches K1, *Kg*, K2 is zero and they are disconnected, the potential of $C_1'$ and $C_2'$ is also zero except for possible small rest charges, which remain owing to the attenuation of the oscillation circuits, and which are removed during the pause between two channels by aid of periodically operating electronic short circuiting contacts K*k*1 and K*k*2.

At the top of FIG. 1 a method is indicated for signal feeding by aid of a signal potential source U with a negligible inner impulse impedance (in the example indicated as a direct voltage battery), which directly over a contact K*s* in coincidence with the contact K2 of the receiving subscriber is periodically connectable to the transmission conductor T2. In this way, however, strong charging currents to the condenser C2 are obtained through the contact K*s*, which can entirely spoil this contact, and furthermore the condenser C2′ is charged to the potential amplitude of the potential source U. This charge, which during certain circumstances is rather large, must be removed during the pause to the next channel in order to avoid signal cross-talk between the channels, and to do this considerable measures would have to be taken. Therefore the signal input ought instead to be arranged according to the invention, which now will be described in detail.

Signal input occurs at the transmission conductor T2 and for this purpose there is an input circuit consisting of an input switch K*s*2, a series inductance L′ and a signal source, which has a negligible inner impulse impedance and also here indicated in the form of a direct current battery with the potential V for the sake of simplicity. The current switch K*s*2 is actuated, i.e. is closed, during a time $\tau' < \tau$. At signal feeding the group switch K*g* is inhibited and signal is thus fed only to the subscriber A*b*2 over T2, K2, L2, LP2 and F2.

In order to obtain a good signal feeding the following requirements have to be put on the shown system:

(1) At the time $t=\tau$, i.e. the opening moment of the switch K2, the current through the switch shall have a zero passage at the same time as the potential of the condenser C2 has a maximum.

(2) At the same moment the potential of the condenser C2′ shall have a minimum and be at or at least be near the zero value.

(3) At release of the switch K*s*2 the current through it shall have a minimum value at or at least near zero, preferably a zero passage.

The first requirement is met if a potential function is generated over the condenser C2′, which potential function is symmetrical in relation to $\tau/2$. Especially suitable for this purpose are the symmetrical potential functions, which have a minimum value at the beginning and at the end of the time $\tau$, since these functions already meet the second requirement. Such potential functions are for example the functions:

$$U=U_0(1-\cos n\omega t) \qquad n=1, 2 \ldots$$

$$\omega=\frac{2\pi}{\tau}$$

Such a potential function with $n=1$ appears for example at ordinary transmission from A*b*1 to A*b*2 if $$C1'+C2'=\frac{2C}{3}$$

with $n=2$ such potential function is obtained if $$C1'+C2'=\frac{2C}{15}$$

If the subscriber A*b*2 for a moment is left out of account, the cosine functions indicated hereabove can be generated by dimensioning the inductance L′ and the condenser C2′ according to the following relation:

$$\tau=2\cdot n\cdot\pi\cdot\sqrt{L'\cdot C2'}$$

The subscriber A*b*2, which in reality is connected over L2, C2, will, however, disturb the indicated potential function by that it draws out energy from the circuit L′, C2′ and therewith attenuates the potential function so that the minimum values do no longer appear at zero. The attenuation is less with increased impedance relation between the LC-combination of the subscriber circuit and the charge circuit, i.e. the relation $$\sqrt{\frac{L2}{C2}}:\sqrt{\frac{L'}{C2'}}$$

ought to be chosen as large as possible. At choice of C2′ the system dimensioning is confined, and from symmetry reasons C1′ and C2′ are wanted equal in size, which gives $$C2'=\frac{C}{3}$$

The dimensioning of L′ is then determined by the choice of $n$ in the potential function. From practical reasons $n$ cannot be chosen larger than 2, because L′ would then be too small and currents in the input circuit too large. An approximative estimate of L′ is therefore made from the relation:

$$2\cdot 2\cdot\pi\sqrt{L'\cdot\frac{C}{3}}=\tau=\pi\sqrt{LC}$$

$$\therefore L'\approx\frac{L}{5,3}$$

where L thus is the inductance value of L2 respectively L.

However, with this dimensioning the influence of the subscriber circuit is still too great. The relations are considerably improved if the switch K*s*2 is disconnected not at the time $\tau$ but earlier, that is at a time $\tau'$ when the current through K*s*2 has a minimum value near zero, whereby the requirement mentioned above is met. The charge remaining in the condenser C2′ at the time $\tau'$ is derived to the oscillation circuit of the subscriber A*b*2 during the time $\tau-\tau'$, which thereby rectifies the potential function over the condenser C2′ so that the requirements 1 and 2 hereabove are met.

With $$C2'=\frac{C}{3}$$

L′ becomes hereby somewhat smaller than previously mentioned, that is $$\frac{L}{6,2}$$

At this $\tau'$ takes about $\frac{4}{5}$ of the time $\tau$.

Figure 2:
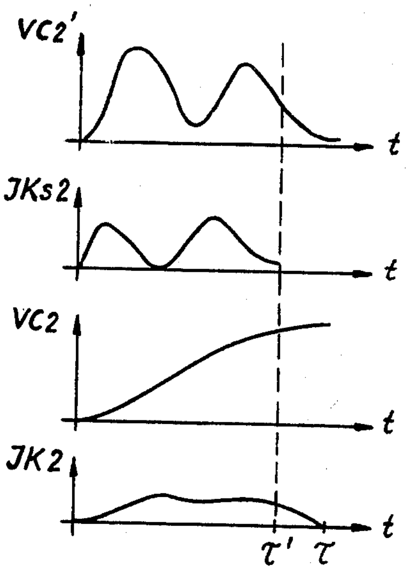
FIG. 2 shows some of the wave forms used in describing the embodiment of FIG. 1.

The now related course is schematically shown in FIG. 2, which shows the potential VC2′ over the condenser C2′, the current IK*s*2 through the switch K*s*2, the potential VC2 over the condenser C2 and the current IK2 through the switch K2 as functions of the time $t$. As appears the potential VC2′ and the current IK2 have minimum values for $t=\tau$, while the current IK*s*2 has a minimum value for $$t=\tau'=\tfrac{4}{5}\tau$$

I claim:

1. In a time-multiplexing system wherein a number of subscribers are connectable to a communication line, an inductance, filter means having a shunt capacitor forming together with said inductance an oscillator circuit, switching means for connecting said line to each subscriber through said inductance and filter means, said switching means being closed and opened at a time $\tau$ to transmit a pulse between two subscribers and said oscillator circuit having a natural oscillation period which is substantially twice time $\tau$, a common charging circuit for charging said oscillator circuit of one of said subscribers, said charging circuit comprising a signal source and an inductance, switching means for connecting the charging circuit to the communication line, said signal source providing a signal pulse symmetric over substantially half of time $\tau$ and having minimum amplitudes at zero time and time $\tau$, respectively, across the oscillator circuit of a subscriber when said subscriber is connected to the communication line through the switching means and said charging circuit is connected to the communication line for a time less than $\tau$, the value of said inductance in said charging circuit being less than the value of said inductance in said oscillator circuit of said subscriber.

2. In a time multiplexing system wherein a number of subscribers in a first subscriber group are connectable to a first communication line, a number of subscribers in a second subscriber group are connectable to a second communication line, switching means for connecting said first and second lines, switching means for connecting said first line to each subscriber of said first group, a first inductance, first filter means having a shunt capacitor forming together with said inductance an oscillator circuit, switching means for connecting said second line to each subscriber of said second group, a second inductance, second filter means having a shunt capacitor forming together with said second inductance an oscillator circuit, said switching means for connecting the subscribers' communication lines being periodically closed and opened together at a time $\tau$ to transmit a pulse between a subscriber of said first group and a subscriber of said second group, and said oscillator circuits having a natural oscillation period which is substantially twice time $\tau$, a common charging circuit for charging said oscillator circuits of said subscribers connectable to one of said communication lines, said charging circuit comprising a signal source and an inductance, switching means for connecting the charging circuit to one of said communication lines, said signal source providing a signal pulse symmetric over substantially half of time $\tau$ and having minimum amplitudes at zero time and time $\tau$, respectively, across the oscillator circuit of a subscriber when said subscriber is connected to said one of said communication lines through the respective switching means and said charging circuit is connected to said one of said communication lines for a time less than $\tau$, the value of said inductance in said charging circuit being less than the value of said inductance in said oscillator circuit of said subscriber.

3. In a time multiplexing system as set forth in claim 2, wherein the value of said inductance in said charging circuit is equal to substantially $$\frac{L}{6.2}$$

where L is the value of said inductance in said oscillator circuit, and said charging circuit is connected to said second line for a time substantially $\frac{4}{5}$ of time $\tau$.

References Cited by the Examiner

UNITED STATES PATENTS

| | | | |
|---|---|---|---|
| 2,878,316 | 3/59 | Boothroyd | 179—15 |
| 2,912,507 | 11/59 | Hughes | 179—15 |
| 2,917,583 | 12/59 | Burton et al. | 179—15 |
| 2,929,879 | 3/60 | Jacobaeus et al. | 179—15 |
| 2,936,337 | 5/60 | Lewis | 197—15 |
| 2,936,338 | 5/60 | James et al. | 179—15 |
| 2,962,551 | 11/60 | Johannesen | 179—15 |
| 2,962,552 | 11/60 | Crowley | 179—15 |

FOREIGN PATENTS 836,756 6/60 Great Britain.

DAVID G. REDINBAUGH, *Primary Examiner.*

ROBERT H. ROSE, *Examiner.*